(12) United States Patent
Constant et al.

(10) Patent No.: US 12,705,565 B2
(45) Date of Patent: Aug. 11, 2026

(54) SYSTEM FOR INBOUND ITEM PREPARATION IN A FULFILLMENT FACILITY

(71) Applicant: Target Brands, Inc., Minneapolis, MN (US)

(72) Inventors: Jeremiah Constant, Inver Grove Heights, MN (US); Mohanraj Subramaniam, Carver, MN (US); Jonathan Lawman, Dayton, MN (US); Kapil Gangwal, Corcoran, MN (US); Marquise Allen, Plymouth, MN (US); Richard Hines, Plymouth, MN (US); Miranda Orr, Elkader, IA (US); Noah E Dahlien, Minneapolis, MN (US); Carissa Staples, Saint Louis Park, MN (US); Simhan Mahesh Puduppadi Kuppaswamy, Plymouth, MN (US); Matthew Anderson, Blaine, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/642,053

(22) Filed: Apr. 22, 2024

(65) Prior Publication Data

US 2025/0328852 A1 Oct. 23, 2025

(51) Int. Cl.
*G06Q 10/0832* (2023.01)

(52) U.S. Cl.
CPC ................................ *G06Q 10/0832* (2013.01)

(58) Field of Classification Search
CPC ............................ B65B 65/003; B65B 65/006
See application file for complete search history.

(56) References Cited

U.S. PATENT DOCUMENTS 9,714,145 B1 7/2017 Lehmann
10,118,723 B2 11/2018 Clark et al.
(Continued)

FOREIGN PATENT DOCUMENTS

CN 111056092 B * 2/2021 .......... B65B 65/006
WO WO-2006017602 A1 * 2/2006 ............ B65B 55/20

OTHER PUBLICATIONS

Shiphereo, "Packing Flow and Station Setup" Sep. 1, 2023, Shiphero Blog, https://www.shiphero.com/blog/packing-flow-and-station-setup (Year: 2023).*

(Continued)

*Primary Examiner* — Jeff Zimmerman
*Assistant Examiner* — Matthew Parker Goodman
(74) *Attorney, Agent, or Firm* — Fish & Richardson P.C.

(57) ABSTRACT

The disclosed technology provides for preparing items for packaging and shipping at a fulfillment location. A method can include receiving, using a user computing device, item information about an item, where the user computing device is configured to receive item information about a plurality of items via a server; transmitting, using the user computing device, the item information to a remote computing device, where the remote computing device is a remote database configured to store information about the plurality of items via the server; obtaining, using the remote computing device, item preparation instructions; receiving, using the user computing device, the item preparation instructions from the remote computing device; and outputting, using the user computing device, the item preparation instructions.

17 Claims, 7 Drawing Sheets

(56) References Cited

U.S. PATENT DOCUMENTS

| | | | | |
|---|---|---|---|---|
| 2001/0017023 | A1 * | 8/2001 | Armington | B65B 61/22 53/503 |
| 2002/0104293 | A1 * | 8/2002 | Armington | B65B 57/12 53/472 |
| 2007/0126578 | A1 * | 6/2007 | Broussard | G06Q 10/087 705/28 |
| 2013/0077124 | A1 * | 3/2013 | Vojak | H04N 1/444 358/1.14 |
| 2016/0328190 | A1 * | 11/2016 | Platts | G06K 15/1807 |
| 2017/0057680 | A1 * | 3/2017 | Schlichting | G06K 7/10425 |
| 2022/0363481 | A1 * | 11/2022 | Terzini | B65B 65/003 |

OTHER PUBLICATIONS

Kapelou, "E-commerce warehouse automation: conveyor systems and solutions" Jan. 25, 2023, Blog Articles, https://kapelou.com/en/blog/intralogistics/e-commerce-warehouse (Year: 2023).* blueyonder.com, "Blue Yonder: Adaptive Fulfillment and Warehousing," retrieved Nov. 6, 2023 from URL <https://blueyonder.com/solutions/warehouse-management>, 4 pages.

manh.com, "Manhattan Associated: Warehouse Management," retrieved Nov. 6, 2023 from URL <https://www.manh.com/solutions/supply-chain-management-software/warehouse-management-system>, 6 pages.

* cited by examiner

Scan printer to connect
314

Product Prep
Scan barcode
316

Product Prep
Large poly bag
Add kraft paper
Tape bag or box closed
Add UPC/Barcode sticker
318

SYSTEM FOR INBOUND ITEM PREPARATION IN A FULFILLMENT FACILITY

TECHNICAL FIELD

This document generally describes devices, systems, and methods related to fulfillment facilities, such as warehouses and distribution centers, that consolidate packing and shipping processes for different items.

BACKGROUND

Items are packaged and shipped through a supply chain that consists of various facilities to provide the items to end-consumers. For example, the supply chain can include a fulfillment facility that can perform processes to prepare items for packaging and shipping. Particular items may need to be packaging using a particular procedure to ensure a quality of a shipped order for end-consumers.

SUMMARY

The document generally describes techniques for a fulfillment facility, such as a warehouse, distribution center, storage facility, fulfillment center, or other type of facility, for preparing items for packing and shipping.

One or more embodiments described herein can include a method for preparing items for packaging and shipping that includes receiving, using a user computing device, item information about an item, where the user computing device is configured to receive item information about a plurality of items via a server; transmitting, using the user computing device, the item information to a remote computing device, where the remote computing device is a remote database configured to store information about the plurality of items via the server; obtaining, using the remote computing device, item preparation instructions; receiving, using the user computing device, the item preparation instructions from the remote computing device; and outputting, using the user computing device, the item preparation instructions.

In some implementations, the embodiments described herein can optionally include one or more of the following features.

In some implementations, the user computing device is configured to receive item information about multiple items from a server, a database, or a combination thereof.

In some implementations, the remote computing device includes a computing system, a storage device, a database, or a combination thereof, and the remote computing device is configured to store the item preparation instructions for the multiple items.

In some implementations, the item preparation instructions are configured to enable a procedure of the user computing device performed by a user associated with the user computing device. In some implementations, the item preparation instructions include one or more steps, one or more materials, or a combination thereof for enabling the procedure, where the procedure includes the item being prepared by the user based on the item preparations instructions, where the user follows the one or more steps, wraps the item with one or more materials, or both.

In some implementations, receiving, using the user computing device, the item information about the item further includes receiving the item information by capturing, using a scanner of the user computing device, a first identifier provided at the item, where the item information is digitalized data associated with the item preparation instructions, and where the first identifier is a barcode label.

In some implementations, the method further includes printing, by a printer configured to communicate with the user computing device, a second identifier for the item, where the second identifier is a barcode label configured to be applied to the item by the user. In this case, the method further includes receiving unique printer identifier information about a printer configured to communicate with the user computing device, by capturing, using the scanner of the user computing device, a third identifier provided at the printer, where the third identifier is a unique printer label, and transmitting, by the user computing device, data to a printer configured to communicate with the user computing device based on receiving the unique printer identifier information, where the data comprises at least the item information.

In some implementations, the method further includes receiving, by a conveyance system, the item, wherein the item is configured to be placed on a conveyor belt of the conveyance system; transmitting, by the conveyance system, an indication to the remote computing device, where the indication indicates that the item has been placed on the conveyor belt; transmitting, by the remote computing device, routing information for the item to the conveyance system based on receiving the indication, wherein the routing information comprises instructions for routing the item to a particular location via the conveyor belt; and routing, by the conveyor belt of the conveyance system, the item to the particular location based on the conveyance system receiving the routing information.

In some implementations, the method further includes receiving, by a second user computing device, order preparation information of the item by capturing the second identifier applied on the item using a second scanner of the second user computing device, wherein the order preparation information is configured to enable a second procedure of the second user computing device by a second user associated with the second user computing device. The second procedure can include the item being packaged by the second user as part of an order, and the item can be a sensitive item that must be packaged using the item preparation instructions to ensure that the order is not compromised.

One or more embodiments described herein can include a system for preparing items for packaging and shipping that includes an image capturing device, a processor, and a memory, where the memory is configured to store instructions that are executable by the processor to cause performance of operations including receiving, using a user computing device, item information about an item, where the user computing device is configured to receive item information about a plurality of items via a server; transmitting, using the user computing device, the item information to a remote computing device, where the remote computing device is a remote database configured to store information about the plurality of items via the server; obtaining, using the remote computing device, item preparation instructions; receiving, using the user computing device, the item preparation instructions from the remote computing device; and outputting, using the user computing device, the item preparation instructions.

In some implementations, the user computing device is configured to receive item information about multiple items from a server, a database, or a combination thereof.

In some implementations, the remote computing device includes a computing system, a storage device, a database, or a combination thereof, and the remote computing device is configured to store the item preparation instructions for the multiple items.

In some implementations, the item preparation instructions are configured to enable a procedure of the user computing device performed by a user associated with the user computing device. In some implementations, the item preparation instructions include one or more steps, one or more materials, or a combination thereof for enabling the procedure, where the procedure includes the item being prepared by the user based on the item preparations instructions, where the user follows the one or more steps, wraps the item with one or more materials, or both.

One or more embodiments described herein can include a second system for preparing items for packaging and shipping that includes a user computing device configured to receive item information about an item, transmit the item information to a remote computing device, receive item preparation instructions from the remote computing device, and output the item preparation instructions, and the remote computing device configured to obtain the item preparation instructions.

In some implementations, the user computing device is configured to receive item information about multiple items from a server, a database, or a combination thereof.

In some implementations, the remote computing device includes a computing system, a storage device, a database, or a combination thereof, and the remote computing device is configured to store the item preparation instructions for the multiple items.

The devices, systems, and techniques described herein may provide one or more of the following advantages. For example, the disclosed techniques provide for improving the efficiency of the processes in the fulfillment facility. In particular, the techniques described can provide a streamlined process for preparing items for packaging and shipping, which can reduce latency in the processes and improve user experience for one or more employees of the fulfillment facility.

Employees of the fulfillment facility can use a digital interface of the user computing device to process and package orders of one or more items, where the items need special handling for shipping. For example, the techniques provide for an employee of the fulfilment facility to scan a received item using a user computing device and receive, using the user computing device, customized item information about preparing and packaging the item for shipping.

For example, when employees package sensitive materials, such as powder and glassware, incorrect or inadequate packaging of these products can result in unfulfilled or damaged delivered orders. Therefore, the innovation provides the digital interface that runs on mobile terminals and indicates whether an item is a sensitive item that must be packaged in a particular manner. The digital interface can use one or more icons to help employees easily recognizes the item and a specific instruction for preparing the item for packaging and shipping. Employees at a packaging facility can use mobile terminals that generate the digital interface. The interface prompts an employee to scan an item. The interface retrieves data associated with the scanned item and displays the packaging instructions for the employee to follow. The instructions can be in a written format, which is retrieved from the database that stores instructions for all items that come in at the preparation facility. Alternatively or in addition, the instructions can include images, symbols, or other visual aids. Alternatively or in addition, the instructions can include audio instructions. Further, the mobile terminal is in data communication with a printer, and the interface allows the employee to print a label (e.g., barcode) for the item directly. As such, the printing process can be initiated directly from the mobile terminal that the employee is using.

As a result, facility operations can be optimized, thereby providing efficient service to the relevant users in the supply chain and accelerating fulfillment facility processes and efficient operations in the supply chain.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
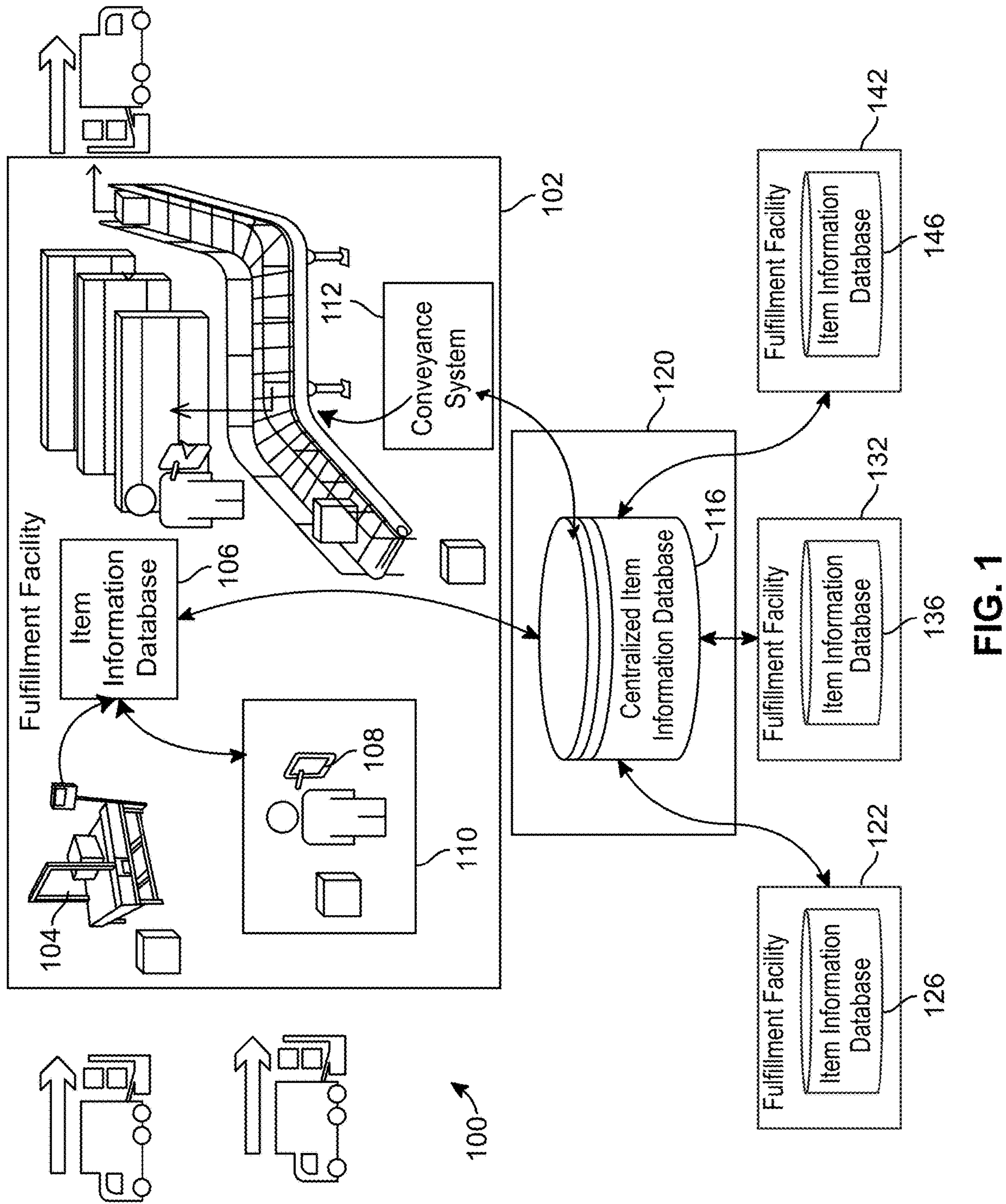
FIG. 1 is an example fulfillment facility for preparing items for packaging and shipping.

This document generally relates to facilities used for preparing items for packaging an and shipping for an order based on different packaging procedures. For example, this document describes a fulfillment facility (e.g., center, storage facility, warehouse, distribution center, fulfillment center) that is specifically designed to receive items, package those items using a particular packaging procedure, sort those items in the center, and ship the items as part of an order. This document describes a method for preparing items for packaging and shipping at the fulfillment facility. In particular, the method includes receiving item information about an item at a user computing device, transmitting item information to a remote computing device using the user computing device, where the remote computing device is a remote database that stores information about multiple items, obtaining the item preparations from the remote computing device, and outputting the item preparation instructions using the user computing device. In this case, the described method can be used to efficiently relay item preparation instructions to employees of the fulfillment facility, which can decrease latency in packaging and shipping and prevent item damage. FIG. 1 illustrates one example configuration for a fulfillment facility 100 wherein the techniques of the present disclosure are implemented. In some implementations, other fulfillment facilities can have other configurations. The other configurations can vary based on a size, design, existing configuration, and/or resources available at the respective sortation facilities. Regardless of the configuration of the fulfillment facility, the disclosed techniques can be implemented in order to prepare items for packaging and shipping in a single facility.

A system of the fulfillment facility 100 can receive multiple items that can be shipped as part of an order (e.g., a customer order). The system can capture and store item information and item preparation instructions about each item in a remote computing device 120 (e.g., server) for use by other facilities 122, 132, 142. The remote computing device can include a computing system and a storage device, such as a database. The remote computing device is configured to use the computing system to access the storage device. The storage device can be a centralized item information database 116.

The centralized item information database 116 includes item information organized by item identifier (such as SKU) so that when items arrive at a fulfillment facility that have already been processed to obtain item information, those items will not need to be processed at other fulfillment facilities. For example, other fulfillment facilities 122, 132, 142 can acquire item information from the centralized item information database 116 and store the item information in the item information database 106, 126, 136, 146 corresponding to fulfillment facility 102, 122, 132, 142. The item information database is configured to store item information for multiple items at the respective fulfillment facility.

The system can provide employees of the facility 100 with item preparation instructions for the received items via a server (e.g., the remote computing device 120) of the facility, via the item information database 106, or both. As described herein, the employees can perform an efficient process for packaging the items based on the item preparation instructions by acquiring the item preparation instructions from the remote computing device and storing the item preparation instructions in a system of the facility.

In particular, items arrive at the first fulfillment facility 102 from vendors or other nodes within a supply chain. Nodes can include distribution centers, flow centers, warehouses, stockrooms, and retail stores. Item information in the form of attribute data is recorded by one or both of an automated measurement device 104 and a user computing device 108. Various attributes of the items are recorded such as dimensions, weight, color, material, whether the item needs special packaging or handling (e.g., whether the item is a sensitive item), and whether the item needs special storage conditions. The item attribute data is initially updated locally in an item information 1 database 106 at the first fulfillment facility 102. In some embodiments, the item information 1 database 106 is part of the same database that stores data about the facility and item information. Through a stored procedure, the item attribute data is synchronized with a centralized item information database 116 that can be sent via a consumer application to update other fulfillment facilities and other systems within the retail supply chain.

Examples of item information for the items include UPCs, TCINs, unit length, unit width, unit height, unit weight, unit volume, casepack length, casepack width, casepack height, casepack weight, casepack volume, whether an expiration data is required, gift wrap eligibility, gift wrap type, oLPN type, critical dimensions of item, packaging information, sensitive item packaging information, whether item ships in its own container, fragility, first receipt flag, prep code, food flap, and warehouse prep code.

An employee of the fulfillment facility 102 can receive an item at an item preparation station 110, and the employee can prepare and package the item for shipping based on receiving item preparation instructions from the item information database 1 106 based on the item information, as described in further detail below with reference to FIGS. 2, 3, and 4.

Once the employee has prepared the item based on the item preparation instructions, the prepared item can be placed at a location of the facility for packaging and shipping. For example, the employee or other employees can carry and place the prepared item on a shelf or rack that is dedicated for that item. Alternatively, the employee can place the item on a conveyor belt of a conveyance system 112 of the facility. The conveyance system can route the item to a particular location of the facility based on the item information, as described in further detail below with reference to FIG. 5. When the item needs to be included in a package, another employee of the facility can grab it from the location and package and ship the item (alone or with other items in the same order) as part of an order for a consumer.

Figure 2:
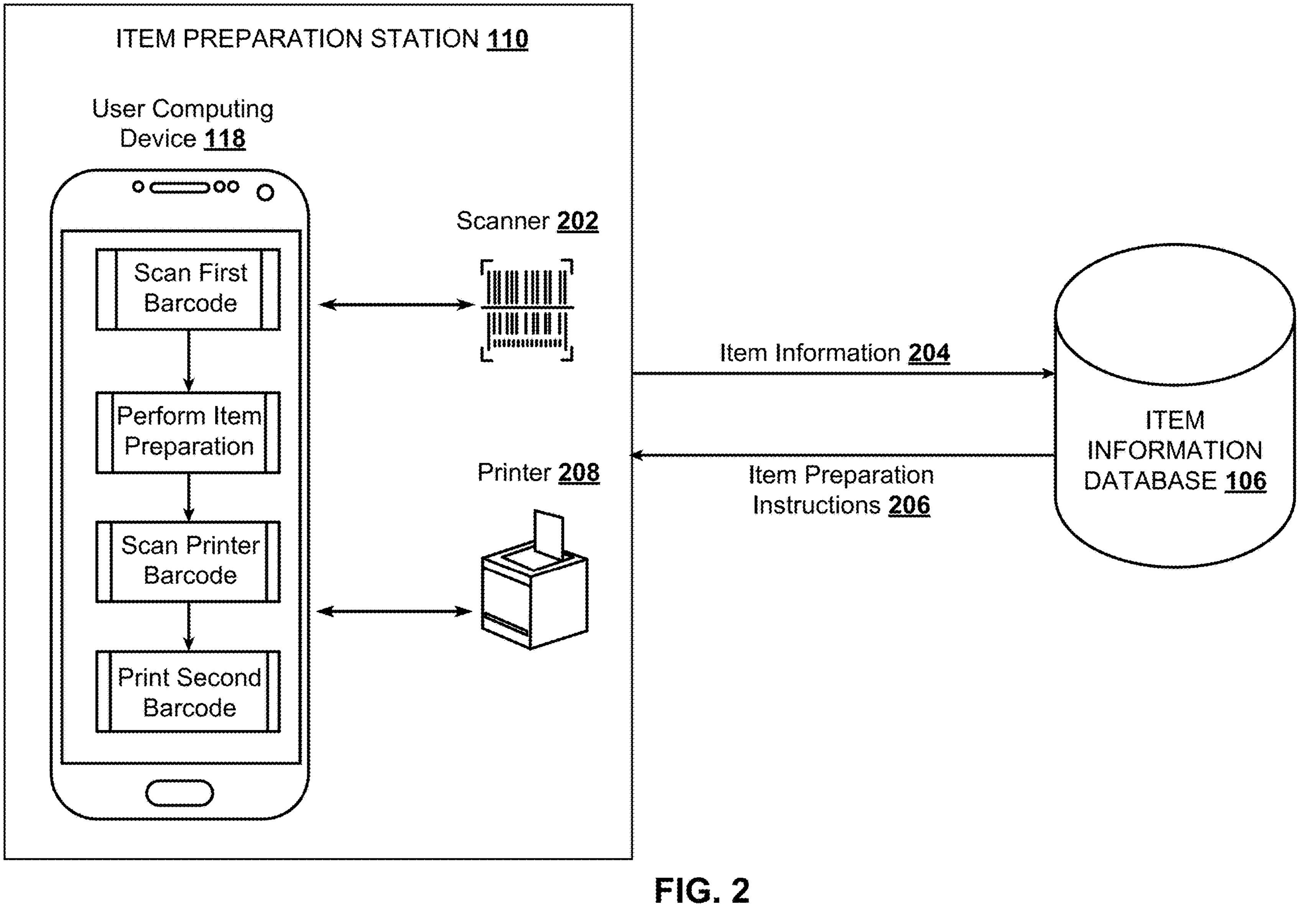
FIG. 2 is a conceptual diagram of a system for preparing items for packaging and shipping in a same fulfillment facility.

FIG. 2 is a conceptual diagram of a system 200 for preparing items for packaging and shipping in a same fulfillment facility. The system 200 can be applied to the fulfillment facility 100 described in FIG. 1. The system 200 can also be applied to any other facility described throughout this disclosure.

The system 200 can include the item preparation station 110 and the item information database 1 106, where the item information database 1 106 is configured to provide data about a particular received item to the item preparation station 110 to enable an employee of the facility to prepare an item.

In particular, the item preparation station 110 includes a user computing device 118, a scanner 202, and a printer 208. The scanner 202 is an image capturing device that a user (e.g., an employee) can use to scan one or more barcodes associated with the item. The printer 208 is a printing device configured to print the one or more barcodes associated with the item. The user computing device 118 is configured to communicate with the devices via a network using wired or wireless connections. The user computing device 118, the scanner 202, and the printer 208 are configured to communicate with each other and with the item information database 106.

As shown in FIG. 2, the item preparation station 110 can transmit item information 204 (e.g., the item information of FIG. 1) from the item information database 1 106. In particular, an employee at the item preparation station 110 can use the scanner 202 to scan a first barcode (e.g., a barcode label) at the item, and the scanner 202 can communicate the item information 204 to the user computing device 118. Based on scanning the first barcode, the employee can send the item information 204 to the item information database 1 106.

Based on receiving the item information 204, the database 106 can look up corresponding item preparation instructions 206. The item preparation instructions 206 can include one or more steps that an employee can implement in order to properly prepare an item for shipping, as described in further detail with reference to FIGS. 3A-3C.

The item information database 1 106 can provide the item preparation instructions 206 to the item preparation station 110. In particular, the user computing device 118 receives the item preparation instructions 206, and the user computing device 118 can display the item preparation instructions 206 for inspection by the employee, as described in further detail with reference to FIGS. 3A-3C.

Based on the item preparation instructions 206, the user computing device 118 can interact with the employee in performing the one or more steps to prepare the item. The employee can then scan a printer barcode of the printer 208. The printer barcode is a unique printer identifier of the printer 208. Based on scanning to the printer barcode, the user computing device 118 can receive printer information for printing a second barcode of the item. The second barcode of the item can indicate the item information 204. The item information 204 associated with the second barcode can be attached the prepared item (e.g., on a surface of the bubble wrapped item) and used to identify the item for package or otherwise fulfill the item for shipping and/or delivering.

The user computing device 118 can send the second barcode of the item to the printer 208, and the printer 208 can print the second barcode. The employee can then apply (e.g., stick on) the second barcode to the item. Another employee can scan the second barcode when preparing an order, as described in further detail with reference to FIG. 5.

Figures 3A, 3B, 3C:
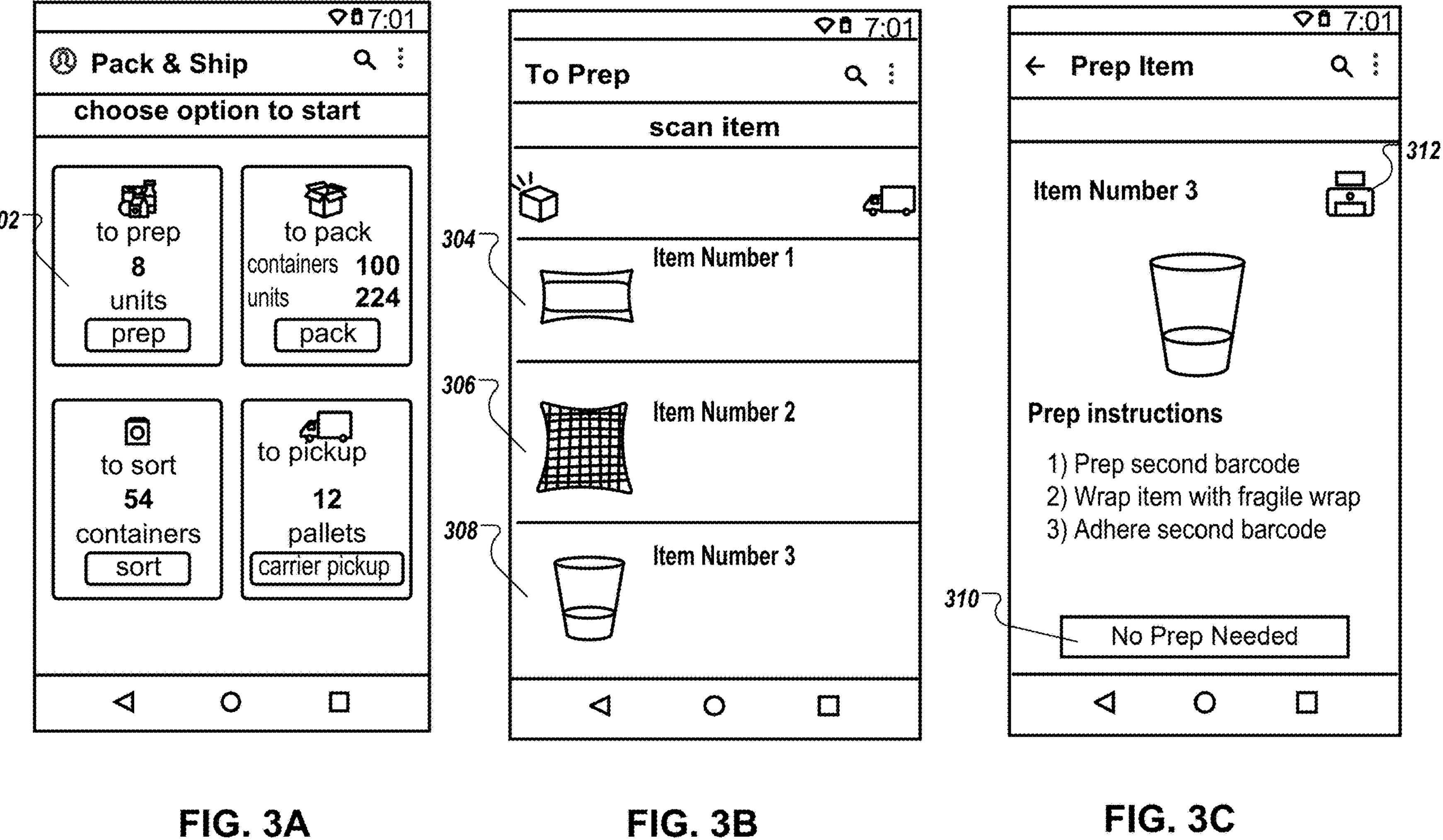
FIGS. 3A-3F show example user computing device interface displays for user computing devices in the system of the same fulfillment facility.

FIGS. 3A-3C show example user computing device interface displays for a user computing device in the facility. With respect to FIG. 3A, the employee can use a user interface of the designated application to prepare an item. For example, the user interface can be a main menu or a settings menu for the dedicated application. In the example shown, the user interface includes controls that the employee can select to view details of items to prepare, items to pack for an order, items to sort, and items for pickup. In some implementations, the user interface can include other controls that allow for other functionality, such as allowing the employee to view particular item information.

A user can select control 302 to prepare items, and selection of control 302 can cause the user computing device to display an updated version of the user interface, as shown in FIG. 3B. The updated user interface is a user interface displayed by the dedicated application as part of the preparation process for items. The user interface can provide information about multiple items for a single order or multiple items for multiple orders. For example, the items can be items received at the fulfillment facility that can be collected and prepared by another employee of the facility for multiple orders.

In the example of FIG. 3B, the user interface further includes controls 304, 306, 308 that allow an employee to select and view item preparation instructions for a particular example item, where each item is associated with an item number. In this example, the employee can select control 308 to update the display an interface to view the item preparation instructions for item number 3, as shown in FIG. 3C.

For example, selection of the control 308 can cause the user computing device to display item preparation instruction including prepping the second barcode, wrapping the item with fragile wrap, and adhering (e.g., applying) the second barcode to the item.

The employee can prepare the item by scanning a printer at the item preparation station to print the second barcode for the item by selecting control 312. For example, selection of control 312 can update the interface for communicate with a printer based on scanning the unique printer identifier, as described in further detail with reference to FIG. 4.

For preparing the item, item 3 is a glass cup, and the item information of item 3 can indicate that item 3 is a sensitive item. In particular, a sensitive item is an item that must be prepared using the item preparation instruction to ensure that an order (e.g., an order including the sensitive item) is not compromised. For example, an order may include other items that could be damaged if item 3 were to break or be damaged during handling or shipping. By following the item preparation instruction of wrapping the item in fragile wrap, an employee can ensure that the item will not damage other items in the order.

In another example, the item can be a container of powder and item preparation instruction can include instructions to wrap the container in wrap (e.g., bubble wrap), to apply tape to the container, or both. By following the item preparation instructions, an employee can ensure that an order that includes the container of power does not damage or contaminate other items in the order.

In another example, the item can be a clothing item, and item preparation instructions can include instructions to fold the clothing item, to remove a hanger from the clothing item, or both.

In another example, the item can be made of sensitive materials, such as glass or ceramic, and the item preparation instructions can include instructions to wrap the item in wrap and to prepare a box for the item (e.g., by filling the box with packaging materials, such as bubble wrap or air pillows). In this case, the item preparation instruction can include instruction to place the item in the prepared box and to refrain from placing other items in the prepared box.

After wrapping the item, the employee can apply the second barcode to the prepared item and select a control that indicates that the item has been prepared. In this example, the employee can include the prepared item as part of the order for packaging and shipping. In some other examples, the employee can provide the item to the conveyance system of the facility by placing the item on the conveyor belt, as described in further detail with reference to FIG. 5.

In some examples, the employee can select control 310 to indicate that no preparation is needed for the item. In particular, the employee can determine that the item does not require particular preparation or wrapping (e.g., the item is not a sensitive item). Selection of the control 310 can be provided as feedback to the item information database, the central item information database, or both. In some examples, whether preparation is needed for a particular item is predetermined. In addition, the preparation instruction for an item is presented to the user computing device only when the item has been predetermined to require particular preparation or wrapping. In this case, the control 310 may not be present in the user interface.

In some other examples, an employee can select a control to provide input for the item preparation instructions. In particular, the employee can provide an indication for the item preparation instructions, such as an indication that the item has fabric and needs protection, the item is a fragile item, or the item is a liquid item.

In some other examples, the employee can indicate whether the first barcode is placed at a predetermined location of the item (e.g., at one side of the item or a certain corner of the item).

Figures 3D, 3E, 3F:
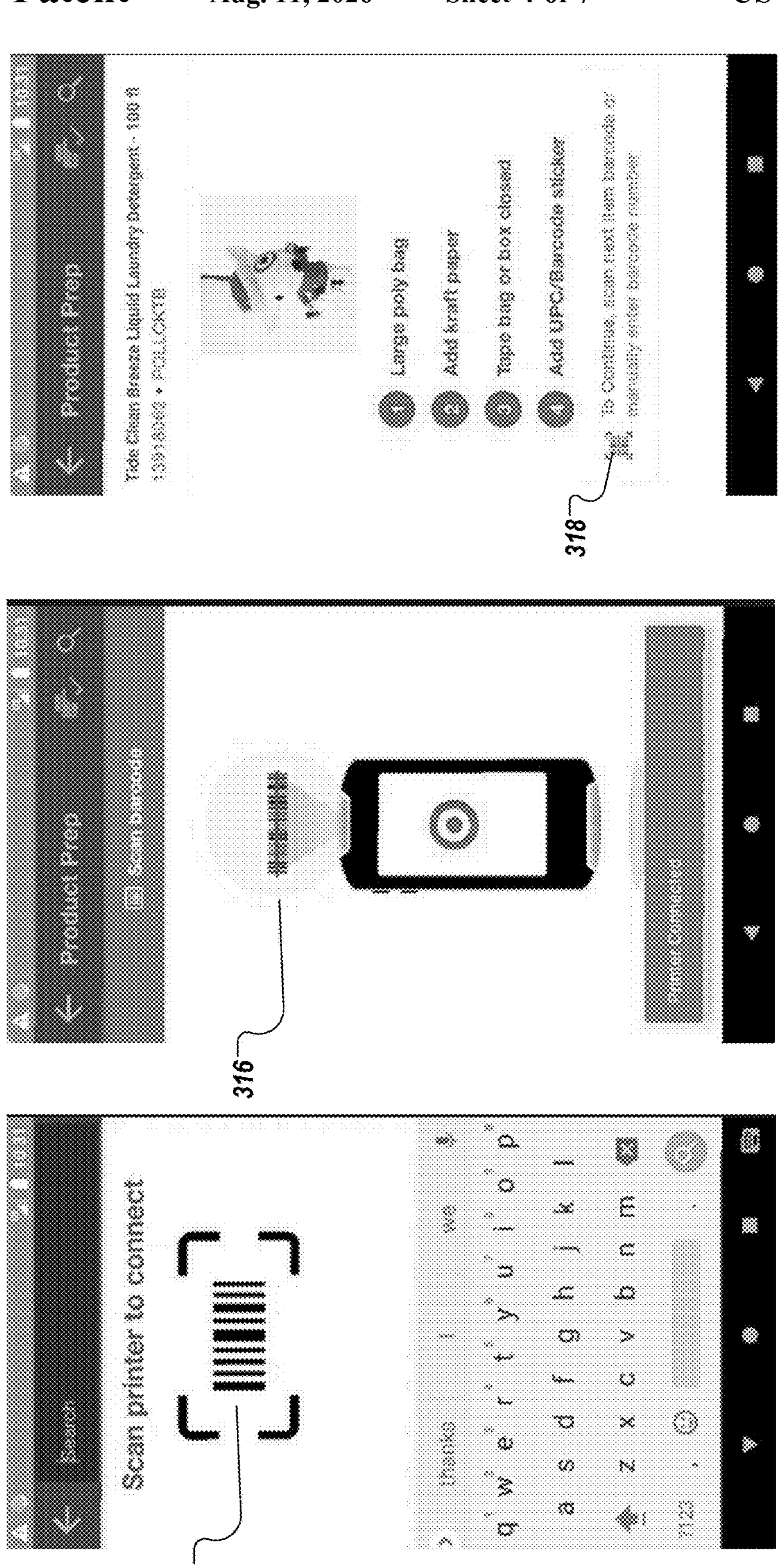

In the example of FIG. 3D, an employee can select a control to use a scanner (e.g., the scanner 202) to scan a printer barcode 314 of a printer (e.g., the printer 208) at the fulfillment station. In this case, the employee can select the control to scan the printer prior to or after receiving the item for preparation. Based on scanning the printer barcode 314, the user device can communicate with the printer to print the second barcode for the item. The user interface can then generate instructions to scan a first barcode 316 of the item, as shown in FIG. 3E.

In this example, the employee can then use the scanner to scan the first barcode 316 of the time prior to preparing the item. Based on scanning the first barcode 316, the user interface can provide the item preparation instructions (e.g., item preparation instructions 206) for preparing the item based on the user device querying the item information database.

FIG. 3F shows another example of the user interface displaying item preparation instructions for the item. In this case, the item is cleaning detergent, which can be labeled as a sensitive item based on the item being a liquid. For example, the item preparation instructions for the liquid can include placing the item in a large bag, adding wrapping paper, taping the bag closed, and placing the second barcode on the prepared item.

In some examples, the user interface can include a control 318 for the employee to manually input a barcode number associated with a first barcode of a next item (e.g., a next item received at the preparation station).

Figure 4:
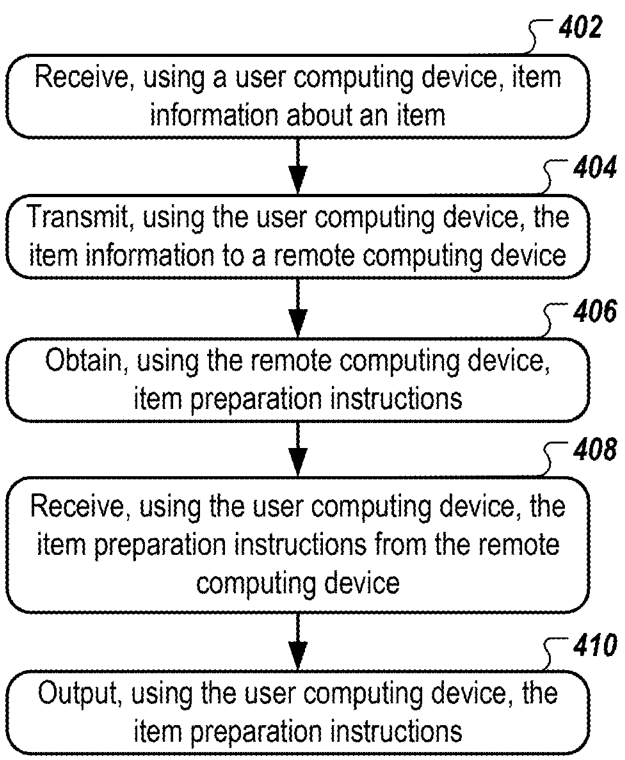
FIG. 4 is a flowchart of a process for preparing an item for packaging and shipping in the fulfillment facility described herein.

FIG. 4 is a flowchart of a process 400 for preparing an item for packaging and shipping in the fulfillment facility described herein. In some implementations, the process 300 can be performed by one or more other computing systems, devices, computers, networks, cloud-based systems, and/or cloud-based services.

Referring to the process 400 in FIG. 4, items are received at the item preparation station of the facility. The item preparation station can be configured to receive the items and prepare the item. Refer to the item preparation station in the example facility 100 of FIG. 1.

At 402, the user computing device can receive item information about an item. The user computing device can receive the item information by scanning a first barcode of the item using a scanner. In particular, the user computing device can be located at the item preparation station of the facility, and the user computing device can be associated with an employee at the item preparation station. The employee can use the scanner to scan the first barcode located at the item.

At 404, the user computing device can transmit the item information to the remote computing device. The remote computing device that can include one or more of a computing system, a storage device, or a database (e.g., the centralized item information database, the item information database 1, or both). In some examples, the user computing device can receive the item information from a server.

At 406, the remote computing device can obtain the item preparation instructions. In particular, the remote computing device can fetch item preparation instructions corresponding to the item information from the centralized item information database, the item information database, or both.

At 408, the user computing device can receive the item preparation instructions from the remote computing device. In some examples, the remote computing device can send the item preparation instructions to the user computing device using a server. In particular, the user computing device can be located at the item preparation station of the facility, and the user computing device can be associated with an employee at the item preparation station.

The item preparation instructions are configured to enable a procedure performed by the employee to properly prepare the item. The item preparation instructions include one or more steps, one or more materials, or both. In this case, the employee can perform the procedure by following the one or more steps, wrapping the item with the one or more materials, or both.

In some examples, the item can be a sensitive item that must be prepared using the item preparation instructions to ensure that an order (e.g., an order that includes the sensitive item) is not compromised (e.g., the item or other items included in the order are not damaged).

At 410, the user computing device can output the item preparation instructions. In particular, the user computing device can display the item preparation instructions for the item on the user device interface of the device. In some examples, the user computing device can display the item preparation instructions based on the employee selecting a control of the user device interface for preparing the particular item.

The user computing device can then communicate with a printer of the item preparation station to print a second barcode for the item. The second barcode includes at least the item information about the item. The employee can apply the second barcode on the item after preparing the item. In particular, the printer has a third barcode that is a unique printer label. The employee can scan the third barcode unique using the scanner, and the scanner can communicate the user computing device to provide printer identifier information about the printer to enable the user computing device to send the third barcode to the printer.

In some examples, the user computing device can print multiple barcodes for multiple items in the case that the multiple items are the same items, which can further streamline the preparation process.

Figure 5:
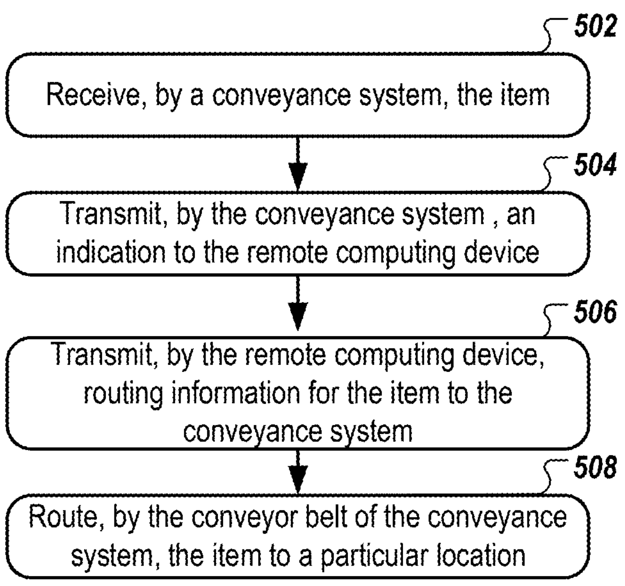
FIG. 5 is a flowchart of a process for preparing an item for packaging and shipping in the fulfillment facility described herein.

FIG. 5 is a flowchart of a process 500 preparing an item for packaging and shipping in the fulfillment facility described herein. In some implementations, the process 400 can be performed by one or more other computing systems, devices, computers, networks, cloud-based systems, and/or cloud-based services.

Referring to the process 500 in FIG. 5, items are received at the conveyance system of the facility. The conveyance system can be configured to receive item for routing throughout the facility. Refer to the conveyance system in the example facility 100 of FIG. 1.

At 502, the conveyance system can receive the item. In particular, an employee that prepared the item can provide the item to the conveyance system by placing the item on the conveyor belt.

At 504, the conveyance system can transmit an indication to the remote computing device. Based on receiving the item, the conveyance system can transmit an indication to the remote computing device indicating that the item has been placed on the conveyor belt. In some examples, the indication can include a request for information from the remote computing device regarding routing information for the item.

At 506, the remote computing device can transmit routing information for the item to the conveyance system. The routing information can include instructions or data for a location to route the item to using the conveyor belt. The routing information can be based on order information for the item (e.g., information that the item is included in an order) or item information.

At 508, the conveyor belt of the conveyance system can route the item to a particular location. In particular, the conveyor belt can route the item to the particular location based on the routing information.

At the location, a second user computing device can receive order preparation information of the item by scanning the second barcode on the item using a second scanner. In particular, a second employee preparing an order that includes the item can scan the second barcode and communicate with the second user computing device to receive the order preparation information. The order preparation information is configured to enable a procedure for the employee to package the item as part of the order. The order preparation information can include instructions for placing the item in a container (e.g., a box) to be shipped, handling information for the item, or pickup information for shipping the order.

Figure 6:
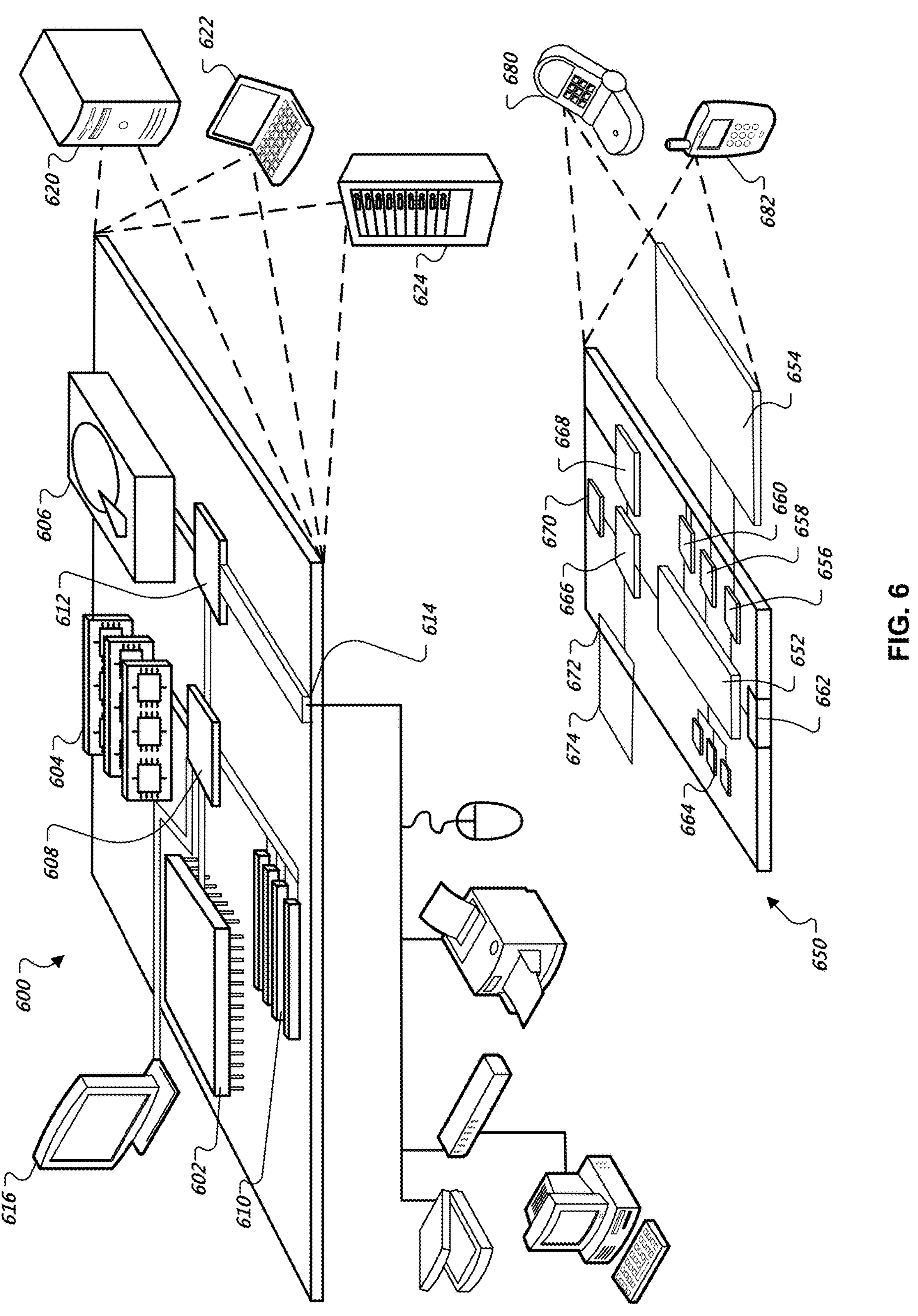
FIG. 6 is a schematic diagram that shows an example of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 660. Each of such devices can contain one or more of the computing device 600 and the mobile computing device 660, and an entire system can be made up of multiple computing devices communicating with each other.

The mobile computing device 660 includes a processor 662, a memory 664, an input/output device such as a display 674, a communication interface 666, and a transceiver 668, among other components. The mobile computing device 660 can also be provided with a storage device, such as a micro-drive or other device, to provide additional storage. Each of the processor 662, the memory 564, the display 554, the communication interface 566, and the transceiver 568, are interconnected using various buses, and several of the components can be mounted on a common motherboard or in other manners as appropriate.

The processor 662 can execute instructions within the mobile computing device 660, including instructions stored in the memory 664. The processor 662 can be implemented as a chipset of chips that include separate and multiple analog and digital processors. The processor 662 can provide, for example, for coordination of the other components of the mobile computing device 660, such as control of user interfaces, applications run by the mobile computing device 660, and wireless communication by the mobile computing device 660.

The processor 662 can communicate with a user through a control interface 668 and a display interface 676 coupled to the display 674. The display 674 can be, for example, a TFT (Thin-Film-Transistor Liquid Crystal Display) display or an OLED (Organic Light Emitting Diode) display, or other appropriate display technology. The display interface 676 can comprise appropriate circuitry for driving the display 674 to present graphical and other information to a user. The control interface 668 can receive commands from a user and convert them for submission to the processor 662. In addition, an external interface 672 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 660, or can also store applications or other information for the mobile computing device 660. Specifically, the expansion memory 674 can include instructions to carry out or supplement the processes described above, and can include secure information also. Thus, for example, the expansion memory 674 can be provide as a security module for the mobile computing device 660, and can be programmed with instructions that permit secure use of the mobile computing device 660. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 662. In some implementations, the computer program product can be received in a propagated signal, for example, over the transceiver 668 or the external interface 672.

The mobile computing device 660 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 660, which can be used as appropriate by applications running on the mobile computing device 660.

The mobile computing device 660 can also communicate audibly using an audio codec 670, which can receive spoken information from a user and convert it to usable digital information. The audio codec 670 can likewise generate audible sound for a user, such as through a speaker, e.g., in a handset of the mobile computing device 660. Such sound can include sound from voice telephone calls, can include recorded sound (e.g., voice messages, music files, etc.) and can also include sound generated by applications operating on the mobile computing device 660.

The mobile computing device 660 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for preparing items for packaging and shipping, the method comprising:

- receiving, using a user computing device, item information about an item by capturing, using a scanner of the user computing device, a first identifier provided at the item, wherein the user computing device is configured to receive item information about a plurality of items via a server;
- transmitting, using the user computing device, the item information to a remote computing device, wherein the remote computing device comprises a remote central item information database configured to store information about the plurality of items via the server;
- obtaining, using the remote computing device, item preparation instructions;
- receiving, using the user computing device, the item preparation instructions from the remote computing device, wherein the item preparation instructions comprise: one or more steps, one or more materials, or a combination thereof for enabling a procedure for the item;
- outputting, using the user computing device, the item preparation instructions;
- preparing, by a user of the user computing device, the item based on item preparation instructions by following the one or more steps, wrapping the item with the one or more materials, or both, wherein the preparing further comprises:
  - determining, by the user of the user computing device, that the item does not require particular wrapping;
  - providing, by the user of the user computing device, feedback to the central item information database indicating that the item does not require particular wrapping; and
  - updating item attribute data associated with the item in the central item information database based on the feedback, such that the updated item attribute data is used for subsequent preparation of the item;
- receiving, by the user computing device, unique printer identifier information by capturing, using the scanner of the user computing device, a third identifier provided at a printer configured to communicate with the user computing device;
- transmitting, by the user computing device, data to the printer based on receiving the unique printer identifier information, wherein the data comprises at least the item information;
- printing, by a printer configured to communicate with the user computing device, a second identifier for the item, wherein the second identifier is configured to be applied to the item by the user, wherein the second identifier is different than the first identifier;
- applying the second identifier to the prepared item;
- placing, by the user, the prepared item on a conveyor belt of a conveyance system after preparing the item;
- transmitting, by the conveyance system, an indication to the remote computing device that indicates that the item has been placed on the conveyor belt;
- transmitting, by the remote computing device, routing information for the item to the conveyance system based on receiving the indication, wherein the routing information comprises instructions for routing the item to a particular location via the conveyor belt;
- routing, by the conveyor belt of the conveyance system, the item to the particular location based on the conveyance system receiving the routing information; and
- receiving, by a second user computing device, order preparation information of the item by capturing the second identifier applied on the item using a second scanner of the second user computing device, wherein the order preparation information is configured to enable a second procedure of the second user computing device by a second user associated with the second user computing device as part of an order.

2. The method of claim 1, wherein the user computing device is configured to receive item information about a plurality of items from a server, a database, or a combination thereof.

3. The method of claim 2, wherein the remote computing device further comprises a computing system, a storage device, or a combination thereof, and wherein the remote computing device is configured to store the item preparation instructions for the plurality of items as item attribute data within the central information database.

4. The method of claim 1, wherein the item information is digitalized data associated with the item preparation instructions, and wherein the first identifier is a barcode label.

5. The method of claim 4, wherein the second identifier is a barcode label.

6. The method of claim 1, wherein the second procedure comprises the item being packaged by the second user as part of an order.

7. The method of claim 1, wherein the item is a sensitive item that must be packaged using the item preparation instructions to ensure that the order is not compromised.

8. A user computing device configured to perform operations for preparing items for packaging and comprising:

- an image capturing device,
- a processor; and
- a memory, wherein the memory is configured to store instructions that are executable by the processor to cause performance of the operations comprising:
  - receiving item information about an item by capturing, using a scanner of the user computing device, a first identifier provided at the item, wherein the user computing device is configured to receive item information about a plurality of items;
  - transmitting the item information to a remote computing device, wherein the remote computing device comprises a remote central item information database configured to store information about the plurality of items via the server;
  - receiving item preparation instructions from the remote computing device, wherein the item preparation instructions comprise: one or more steps, one or more materials, or a combination thereof for enabling a procedure for the item;

outputting the item preparation instructions;

preparing, by a user of the user computing device, the item based on item preparation instructions by following the one or more steps, wrapping the item with the one or more materials, or both, wherein the preparing further comprises:

determining, by the user of the user computing device, that the item does not require particular wrapping;

providing, by the user of the user computing device, feedback to the central item information database indicating that the item does not require particular wrapping; and updating item attribute data associated with the item in the central item information database based on the feedback, such that the updated item attribute data is used for subsequent preparation of the item;

receiving, by the user computing device, unique printer identifier information by capturing, using the scanner of the user computing device, a third identifier provided at a printer configured to communicate with the user computing device;

transmitting, by the user computing device, data to the printer based on receiving the unique printer identifier information, wherein the data comprises at least the item information;

printing, by a printer configured to communicate with the user computing device, a second identifier for the item, wherein the second identifier is configured to be applied to the item by the user, wherein the second identifier is different than the first identifier;

applying the second identifier to the prepared item;

placing, by the user, the prepared item on a conveyor belt of a conveyance system after preparing the item;

transmitting, by the conveyance system, an indication to the remote computing device that indicates that the item has been placed on the conveyor belt;

transmitting, by the remote computing device, routing information for the item to the conveyance system based on receiving the indication, wherein the routing information comprises instructions for routing the item to a particular location via the conveyor belt;

routing, by the conveyor belt of the conveyance system, the item to the particular location based on the conveyance system receiving the routing information; and receiving, by a second user computing device, order preparation information of the item by capturing the second identifier applied on the item using a second scanner of the second user computing device, wherein the order preparation information is configured to enable a second procedure of the second user computing device by a second user associated with the second user computing device as part of an order.

9. The user computing device of claim 8, wherein the user computing device is configured to receive the item information about the plurality of items from a server, a database, or a combination thereof.

10. The user computing device of claim 8, wherein the item information is digitalized data associated with the item preparation instructions, and wherein the first identifier is a barcode label.

11. The user computing device of claim 10, wherein the second identifier is a barcode label.

12. The user computing device of claim 8, wherein the second procedure comprises the item being packaged by the second user as part of an order.

13. A system for preparing items for packaging and shipping, the system comprising:

a user computing device and the remote computing device configured to perform operations comprising:

receiving, using a user computing device, item information about an item by capturing, using a scanner of the user computing device, a first identifier provided at the item, wherein the user computing device is configured to receive item information about a plurality of items via a server;

transmitting, using the user computing device, the item information to a remote computing device, wherein the remote computing device comprises a remote central item information database configured to store information about the plurality of items via the server;

obtaining, using the remote computing device, item preparation instructions;

receiving, using the user computing device, the item preparation instructions from the remote computing device, wherein the item preparation instructions comprise: one or more steps, one or more materials, or a combination thereof for enabling a procedure for the item;

outputting, using the user computing device, the item preparation instructions;

preparing, by a user of the user computing device, the item based on item preparation instructions by following the one or more steps, wrapping the item with the one or more materials, or both, wherein the preparing further comprises:

determining, by the user of the user computing device, that the item does not require particular wrapping;

providing, by the user of the user computing device, feedback to the central item information database indicating that the item does not require particular wrapping; and updating item attribute data associated with the item in the central item information database based on the feedback, such that the updated item attribute data is used for subsequent preparation of the item;

receiving, by the user computing device, unique printer identifier information by capturing, using the scanner of the user computing device, a third identifier provided at a printer configured to communicate with the user computing device;

transmitting, by the user computing device, data to the printer based on receiving the unique printer identifier information, wherein the data comprises at least the item information;

printing, by a printer configured to communicate with the user computing device, a second identifier for the item, wherein the second identifier is configured to be applied to the item by the user, wherein the second identifier is different than the first identifier;

applying the second identifier to the prepared item;

placing, by the user, the prepared item on a conveyor belt of a conveyance system after preparing the item;

transmitting, by the conveyance system, an indication to the remote computing device that indicates that the item has been placed on the conveyor belt;

transmitting, by the remote computing device, routing information for the item to the conveyance system based on receiving the indication, wherein the routing information comprises instructions for routing the item to a particular location via the conveyor belt;

routing, by the conveyor belt of the conveyance system, the item to the particular location based on the conveyance system receiving the routing information; and receiving, by a second user computing device, order preparation information of the item by capturing the second identifier applied on the item using a second scanner of the second user computing device, wherein the order preparation information is configured to enable a second procedure of the second user computing device by a second user associated with the second user computing device as part of an order.

14. The system of claim 13, wherein the user computing device is configured to receive the item information about a plurality of items from a server, a database, or a combination thereof.

15. The system of claim 14, wherein the remote computing device further comprises a computing system, a storage device, or a combination thereof, and wherein the remote computing device is configured to store the item preparation instructions for the plurality of items as item attribute data within the central information database.

16. The system of claim 13, wherein the item information is digitalized data associated with the item preparation instructions, and wherein the first identifier is a barcode label.

17. The system of claim 16, wherein the second identifier is a barcode label.

* * * * *